Aug. 23, 1960 R. B. J. BRUNN 2,950,463
PULSE-TRANSLATING SYSTEM
Filed June 8, 1954 5 Sheets-Sheet 4

# United States Patent Office 2,950,463
Patented Aug. 23, 1960

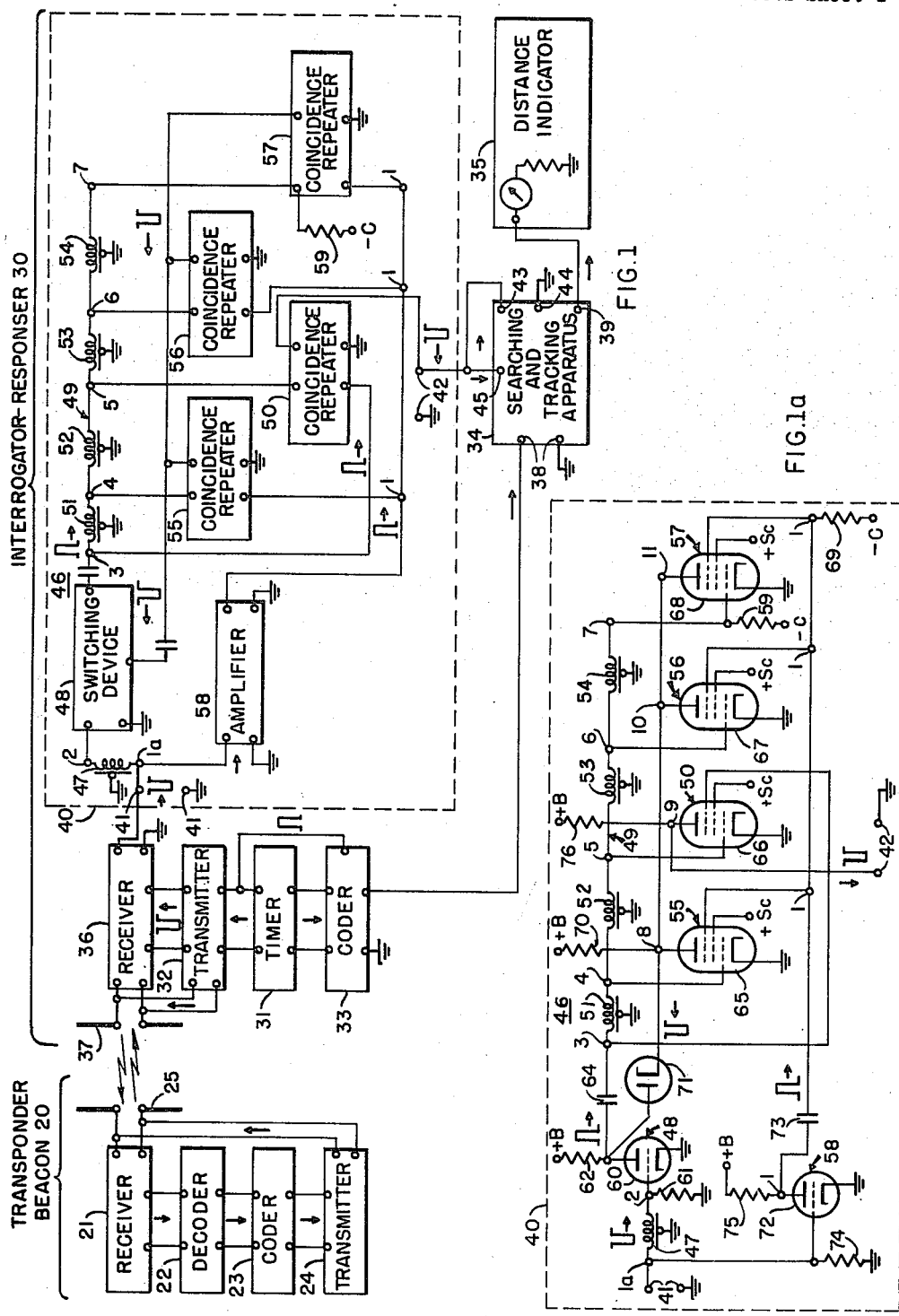

2,950,463
PULSE-TRANSLATING SYSTEM

Robert B. J. Brunn, deceased, late of Manhasset, N.Y., by Eleanor B. Brunn, executrix, Plandome, N.Y., assignor to Hazeltine Research, Inc., Chicago, Ill., a corporation of Illinois Filed June 8, 1954, Ser. No. 435,339

14 Claims. (Cl. 340—164)

General

The present invention relates to pulse-translating systems and, more particularly, to pulse-translating systems which are capable of developing an output signal in response to wanted pulse combinations having a desired spacing while discriminating against unwanted pulse combinations occurring at random but which may have the desired spacing. Such systems are often referred to as decoders and have particular utility in the distance-measuring equipment used in aircraft navigation systems. Accordingly, the invention will be described in that environment.

One important requirement in aerial navigation is the determination of the distance between an aircraft in flight and known geographic points along the line of flight. Distance-measuring equipment has been employed in aircraft to provide a pilot with an indication of the distance between his aircraft and such points. Modern airborne equipment usually comprises a transmitter for transmitting coded pulses for interrogating selected terrestrially located responder beacons along the line of flight. Individual ones of these beacons may respond only to pulses corresponding to their particular interrogating code by transmitting coded reply pulses for use by the distance-measuring equipment on the aircraft. Desired reply pulses actuate the coding apparatus in the distance-measuring equipment and a voltage is derived which is representative of the round-trip propagation time between the aircraft and the responder beacon. It will be evident that the magnitude of this voltage changes in accordance with the relative movement between the aircraft and the beacon.

In order to utilize the coded reply pulses of a selected beacon which is being interrogated by the moving aircraft, the distance-measuring equipment is provided with a searching system which is effective to place the equipment in a state of selective response to the coded reply signals from a selected responder beacon. To accomplish searching, distance-measuring equipment includes a receiver having a received-signal-translating channel that is normally blocked and a gated circuit therein for conditioning the channel to translate pulses which may be received within a short gating interval. Varying the time relation of the gating interval relative to the transmission of the interrogating pulses from the distance-measuring equipment is effective to achieve searching, as will be clear from a consideration of the following example. Assuming that the receiver is gated or conditioned to translate pulses within a short interval after the interrogating signal is sent out and that a reply signal is returned directly, as in the case where the aircraft is very close to the beacon, the beacon reply is accepted and a distance indication is obtained. If the reply should be delayed beyond the duration of the short gating interval, thus representing a greater separation of the aircraft and the beacon, that reply is not accepted. However, delaying the gating interval relative to the transmitted interrogation may condition the receiver to accept the delayed reply and allow the distance-measuring circuits to provide an indication of a greater distance from the aircraft to the beacon. When a reply has been found, the search is discontinued and a tracking system is energized to keep the reply within the gating time to facilitate an accurate determination of distance.

The distance-measuring equipment includes coding and transmitting apparatus for interrogating any selected one of a plurality of responder beacons and also includes suitable decoders which, for the most part, select only coded reply pulses (such as paired pulses having a predetermined spacing) received from the selected responder beacon, thus materially reducing the possibility of the searching operation being interrupted by interrogating or challenging pulses received from nearby aircraft or by reply pulses from a beacon or beacons which responded to those challenges. However, in regions of heavy aircraft traffic, those pulses may occur at random and a bunching of the random pulses produces undesired pulse combinations having a spacing corresponding to the interrogating code and to the reply code of the interrogated beacon. These undesired pulse combinations constitute a "pseudo desired signal" which is actually a false signal that is not rejected by the conventional pulse-translating system or decoder in the receiver of the interrogating aircraft or in the decoder in the receiver of the responder beacon and undesirably (a) increases the search time of the distance-measuring equipment by unnecessarily interrupting the searching operation, (b) places a large power demand on the transponder beacon by increasing its duty cycle, and (c) lowers the over-all efficiency and performance of the distance-measuring equipment in regions of heavy aircraft traffic where efficiency and performance are more important considerations than in regions of light traffic.

Heretofore, it has been customary to regard the random undesired pulse combinations having the desired spacings as being unavoidable and to base the performance of the distance-measuring equipment of an air navigation system on probability calculations wherein the undesired signals are treated as a random phenomenon.

It is an object of the invention, therefore, to provide a new and improved pulse-translating system or decoder which avoids one or more of the above-mentioned disadvantages and limitations of prior such systems.

It is another object of the invention to provide a new and improved pulse-translating system for use in the distance-measuring equipment of a navigation system to improve the efficiency and the performance of that navigation system.

It is a further object of the invention to provide a new and improved pulse-translating system which responds to wanted pulse combinations having a desired spacing while discriminating against unwanted pulse combinations occurring at random but which may have the desired spacing.

It is an additional object of the invention to provide a new and improved pulse-translating system which is particularly useful in responding to paired pulses having a desired spacing while discriminating against unwanted paired pulses occurring at random but having the desired spacing.

In accordance with a particular form of the invention, a pulse-translating system comprises an input circuit for supplying desired pulse groups having a given pulse spacing and subject to the translation of a plurality of other pulse groups which may combine at random to produce undesired pulse groups having the aforesaid given spacing. The pulse-translating system also includes a pulse-translating network coupled to the aforesaid input circuit and including a control device and a pulse-selector circuit responsive to the desired pulse groups for deriving therefrom a desired output signal but which tends to respond to and develop from the undesired pulse groups an undesired output signal. The pulse-translating circuit further includes a means including control apparatus coupled to the pulse-translating network and the control device and effectively responsive to pulses of the aforesaid other pulse groups for deriving and applying to the control device a control signal which momentarily places the network in a non-translating condition, whereby the system has a reduced tendency to develop the undesired output signal while deriving the desired output signal.

For a better understanding of the present invention, together with other and further objects thereof, reference is had to the following description taken in connection with the accompanying drawings, and its scope will be pointed out in the appended claims.

Referring to the drawings:

Fig. 1 is schematic diagram of a transponder beacon and an interrogator-responser of a radio-position locator or distance-measuring system which includes a pulse-translating system in accordance with the present invention;

Fig. 1a is a circuit diagram of the pulse-translating system represented schematically in Fig. 1;

Figure 2A:
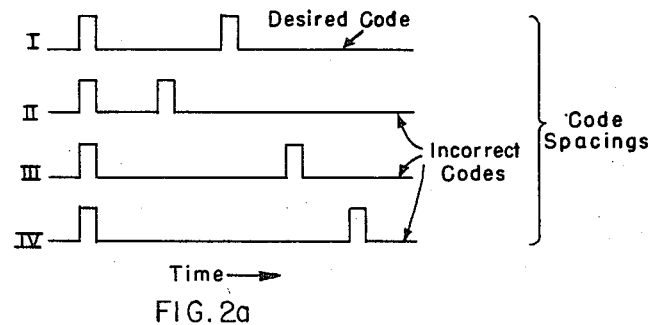
Figure 2B:
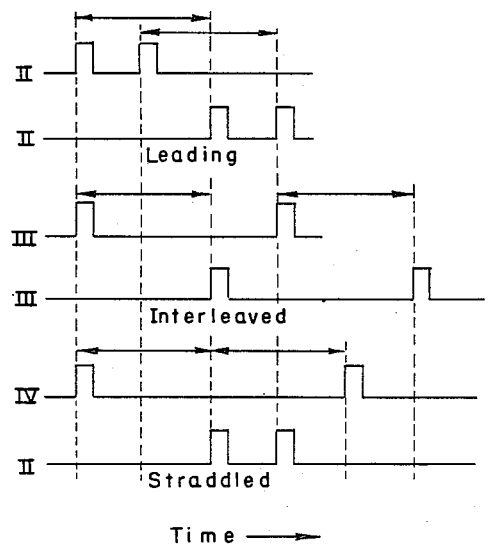
Figure 2C:
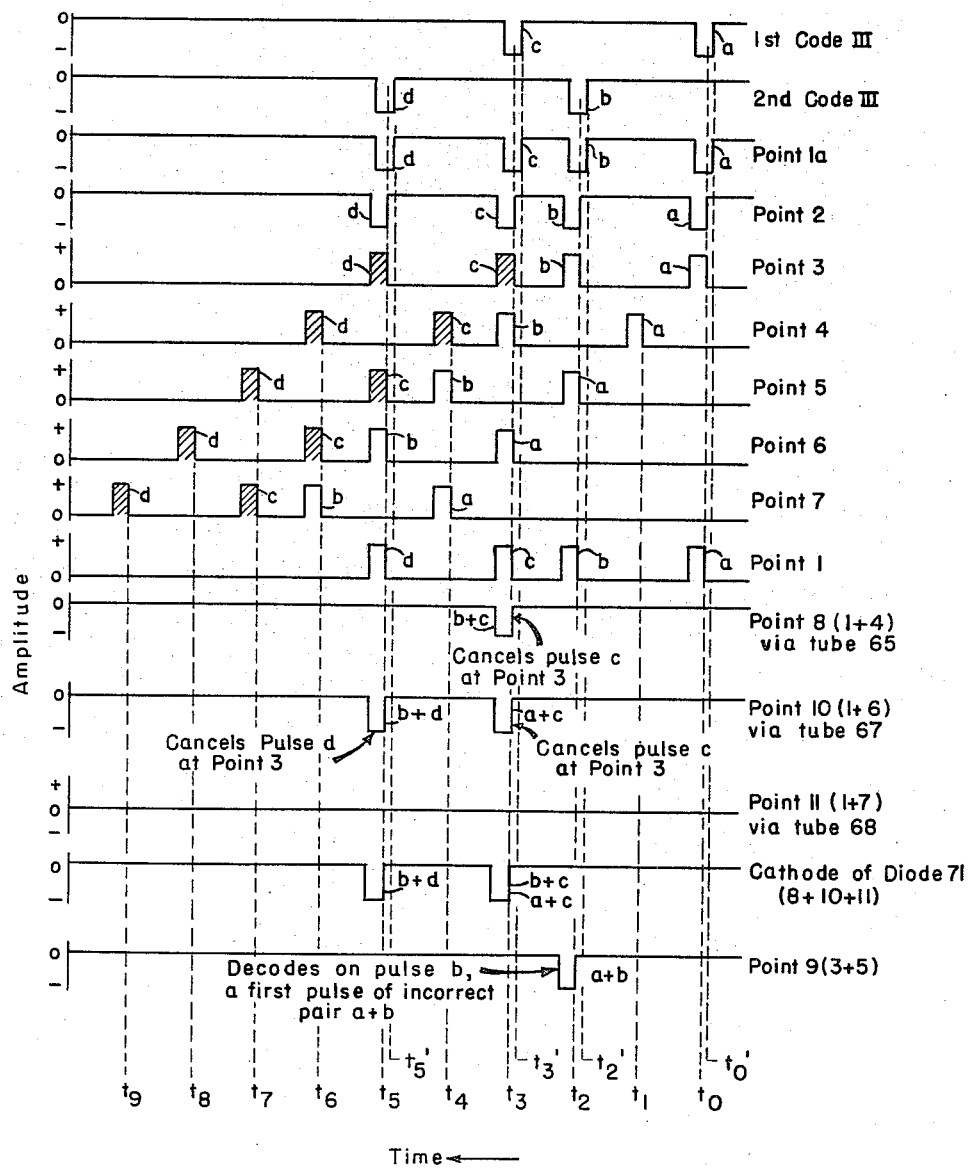
Figure 3:
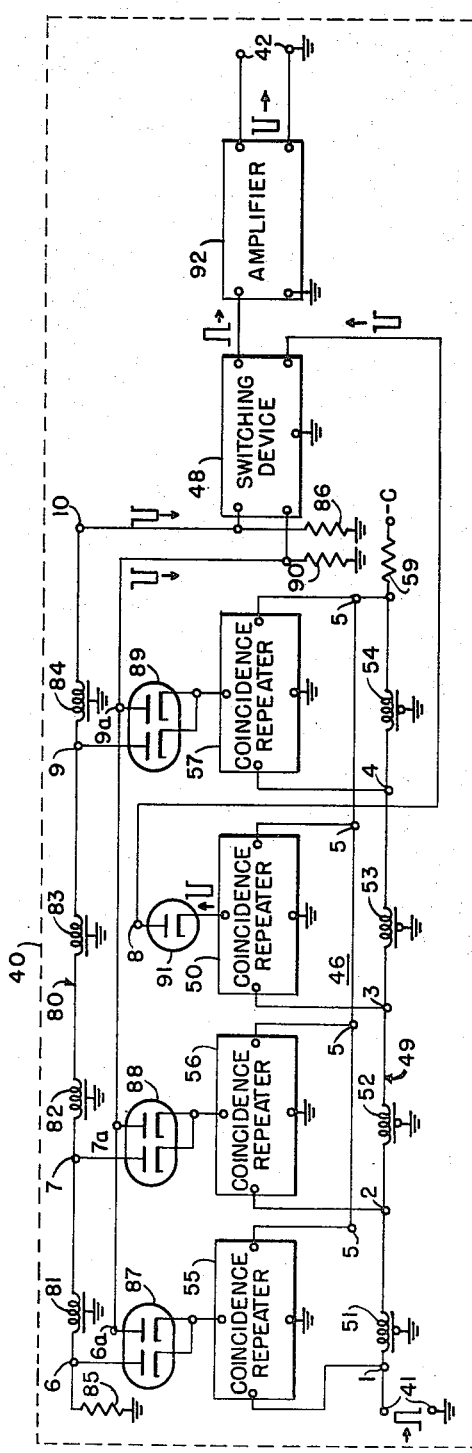
Figure 3A:
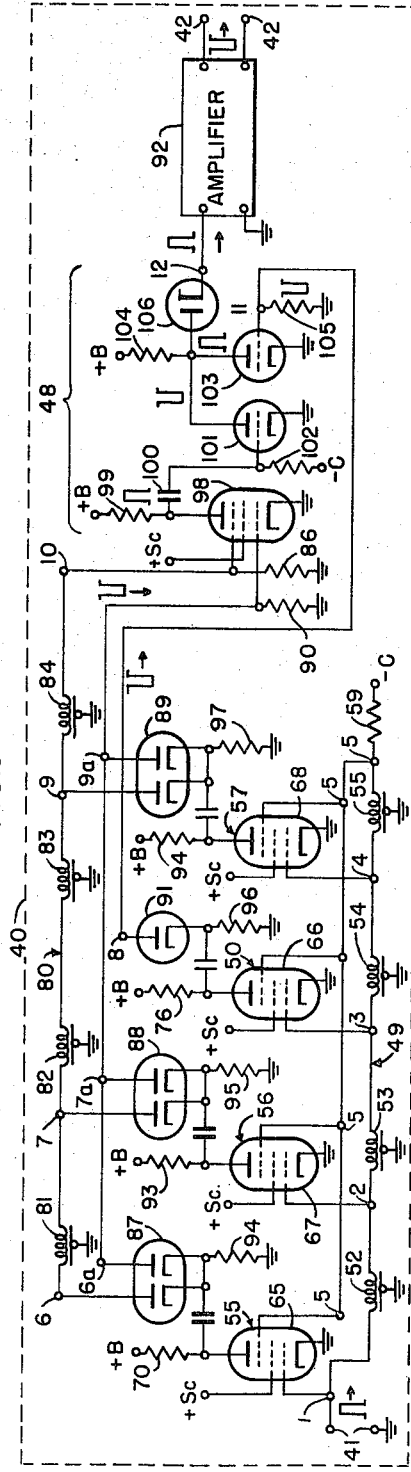

Figs. 2a–2c, inclusive, are graphs utilized in explaining the operation of the pulse-translating system of Fig. 1a;

Fig. 3 is a schematic diagram of a modified form of the pulse-translating system of Fig. 1;

Fig. 3a is a circuit diagram of the Fig. 3 pulse-translating system, and

Figure 4:
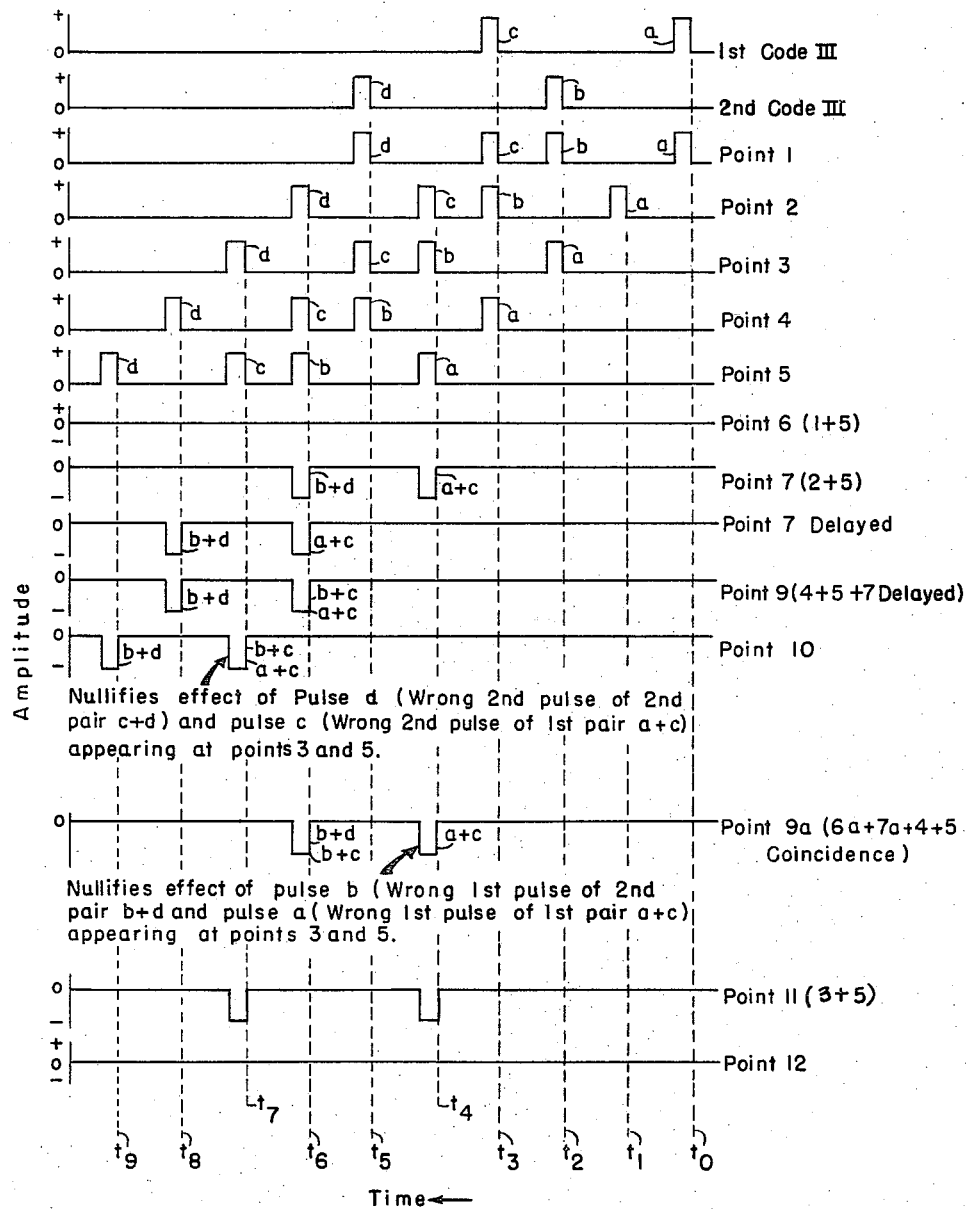

Fig. 4 is a graph useful in understanding the operation of the Fig. 3a system.

*Description of Fig. 1 distance-measuring system including pulse-translating system or decoder 40*

Referring now more particularly to Fig. 1 of the drawings, there is represented a distance-measuring system including a transponder beacon 20, which may be terrestrially located, that includes a receiver 21 which is coupled in cascade with a decoder 22 of suitable construction, a coder 23, and a transmitter 24. The receiver 21 and the transmitter 24 are coupled to a common antenna system 25.

The distance-measuring system also includes a distance-measuring equipment or interrogator-responser 30, which will be assumed to be installed in an aircraft in flight, that includes means for transmitting coded periodic time-reference pulses such as paired pulses and for receiving position-representative delay pulses, which also may be coded paired pulses, from the terrestrially located transponder beacon 20. The transmitting means of the interrogator-responser 30 includes a timer 31 coupled to a transmitter 32 for supplying periodic timing pulses thereto. A coder 33 is coupled to a pair of input terminals 38, 38 of a searching and tracking apparatus 34 for supplying control pulses thereto. A suitable searching and tracking apparatus for the unit 34 is described and claimed in Patent No. 2,491,029, granted December 13, 1949, to R. B. J. Brunn, and entitled "System for Translating Pulse Signals of Variable Time Delay" and in the copending application of C. J. Hirsch, Serial No. 186,843, filed September 26, 1950, and entitled "Control System." The output terminals 39, 44 of the searching and tracking apparatus 34 are coupled to a distance indicator 35 of suitable construction. The coder 33 is also coupled to the transmitter 32 for supplying periodic pulses of positive polarity which are delayed with reference to the pulses from the timer 31. The transmitter 32 is designed to transmit periodic time-reference pulses in the form of wave-signal pulses of predetermined duration and spacing representative of a particular interrogating code of the interrogator-responser 30. The latter also includes a receiver 36 coupled to an antenna system 37 common to the transmitter and the receiver thereof. An output circuit of the transmitter may be coupled to the receiver 36 for supplying thereto negative-polarity disabling pulses to disable the receiver each time the transmitter develops a radio-frequency pulse for application to the antenna system 37.

Interrogator-responser 30 of the distance-measuring system further includes a pulse-translating system or decoder 40 having a pair of input terminals 41, 41 coupled to the output circuit of the receiver 36 and having a pair of output terminals 42, 42 coupled to two pairs of input terminals 43, 44 and 45, 44 of the searching and tracking apparatus 34. The units thus far described, with the exception of the decoder 40 which is constructed in accordance with the present invention and will be described in detail subsequently, may be of conventional construction and operation so that a detailed description and explanation of the operation thereof are unnecessary.

*General explanation of operation of distance-measuring system of Fig. 1*

In considering briefly the general operation of the described distance-measuring system as a whole, it will be assumed initially that the decoder 22 of the beacon 20 translates paired pulses having a particular spacing established by the coder 33 of interrogator-responser 30 and that the decoder of interrogator-responser 30 is conditioned to translate paired pulses having a spacing established by the coder 23 of beacon 20. Each timing pulse which the timer 31 applies to the transmitter 32 causes the latter to develop a first radio-frequency pulse for radiation by the antenna system 37. A predetermined time interval after each timing pulse is applied thereto, the coder 33 develops a second timing pulse for application to the transmitter 32 and simultaneously develops another timing pulse of suitable polarity for application to the input terminals 38, 38 of the searching and tracking device 34 for controlling the operation of the sweep circuits thereof. The timer 31 and the coder 33 are, therefore, effective to apply a series of paired timing pulses to the transmitter 32 and the spacing between individual pulses of a pair is determined by the parameters of the coder 33. The transmitter 32 similarly develops the second radio-frequency pulses of the pairs and applies them to the antenna 37 for radiation thereby. Simultaneously with the generation of each radio-frequency pulse, the transmitter 32 generates a control pulse for disabling the receiver 36 at least during the transmission intervals.

The paired radio-frequency pulses are intercepted by the receiver 21 of the transponder beacon 20 and are applied to its decoder 22 which develops a single output pulse in response to each coded pair for application to the coder 23. The coder is effective to develop pairs of triggering pulses for application to the transmitter 24 which develops paired radio-frequency pulses for application to and radiation by the antenna system 25. These radio-frequency pulses are intercepted by the antenna system 37 and are applied to the receiver 36 which develops an output pulse of negative polarity for each received radio-frequency pulse and applies that output pulse to the input terminals 41, 41 of the pulse-translating system or decoder 40.

The decoder 40 effectively develops at its output terminals 42, 42 a single output or control pulse in response to each applied pair having the correct spacing. When a sufficient number of consecutive control pulses are applied to the terminals 43, 44 and 45, 44 of the searching and tracking apparatus 34 in conjunction with pulses applied to terminals 38, 38 thereof from the coder 33, in the manner more fully explained in the above-identified patent and copending application, the apparatus 34 operates in its tracking mode and produces an output signal for application to the distance indicator 35 which is then effective to provide a continuous indication of the varying distance between the airborne interrogator-responser 30 and the ground beacon 20. Assuming for the moment that the receiver 36 fails for a brief interval to intercept the paired radio-frequency pulses radiated by the transponder beacon 20 for some reason such as an obstacle in the propagation path between the beacon and the interrogator-responser 30, the apparatus 34 will operate in its searching mode until a series of paired radio-frequency pulses having the desired spacing are received by unit 36.

Other aircraft carrying interrogator-responser units similar to unit 30 may be flying in the vicinity of the terrestrially located beacon 20 and may be attempting to interrogate that beacon by means of paired pulses. These paired interrogating pulses may have spacings which are quite different from the code spacing of the interrogator-responser 30 and they may represent undesired pulse groups or combinations which may undesirably influence the operation of the searching and tracking apparatus as controlled by the decoder 40. These undesired pulse groups may occur at random and may be so interleaved or otherwise arranged in time as to create random pulse pairs having a pulse spacing which would be accepted by a conventional decoder that might be connected in circuit in lieu of the decoder 40. Such a conventional decoder would respond to at least some of the undesired pulse groups and produce a series of output pulses which would cause the searching and tracking apparatus 34 to track for a short period of time when it should be searching for a reply from the beacon 20. This erroneous mode of operation would be undesirable for reasons already stated. The decoder 40 in accordance with the present invention is effective materially to reduce the possibility of translating undesired pulse groups which might undesirably affect the proper operation of the searching and tracking unit 34.

*Description of pulse-translating system or decoder 40 of Fig. 1*

Referring now more particularly to the pulse-translating system or decoder 40 of Fig. 1, this system includes an input circuit comprising the terminals 41, 41 and the electrical connections associated therewith for supplying desired pulse groups having a given pulse spacing and subject to the translation of a plurality of other pulse groups which may combine at random to produce undesired pulse groups having the aforesaid given spacing. Paired-pulse groups are commonly employed in present-day distance-measuring systems. Accordingly, the invention will be described and explained in connection with the use of paired pulse groups although it will be understood that decoders of the type under consideration may be designed to accommodate other multiple-pulse groups.

The decoder 40 includes a pulse-translating network 46 coupled to the input terminals 41, 41, which network comprises a time-delay means or time-delay network 47 which affords a very short delay to translated signals, a control device in the form of a normally closed electronic switching device 48, a time-delay means preferably in the form of a one-way time-delay network 49 having a plurality of network sections to be described more fully subsequently, and a pulse-selector circuit in the form of a coincidence detector or repeater 50 coupled to one of the network sections. As will be explained hereinafter, the network 46 is responsive to desired pulse groups or paired pulses for deriving therefrom in the output circuit of the coincidence repeater 50 a desired output signal but which tends to respond to and develop from the aforesaid undesired pulse groups an undesired output signal. The output circuit of the coincidence repeater 50 is coupled to the output terminals 42, 42 of decoder 40. The time-delay network 49 includes winding portions equal in number to the pulse combinations which are likely to be used in the distance-measuring system and, hence, are likely to be received by the receiver 36. To facilitate the explanation and understanding of the present invention, it will be assumed that the receiver is likely to apply to the decoder four different types of pulse groups comprising paired pulses having a given or correct pulse spacing, and also to apply three other types of pulse groups comprising paired pulses having incorrect spacings but which may combine at random to produce undesired pulse groups, at least some of which have the correct pulse spacing. For example, the distance-measuring system may be considered to employ paired pulses having 5-, 10-, 15-, and 20-microsecond spacings for communication between one or more transponder beacons such as beacon 20 and a plurality of airborne interrogator-responsers such as unit 30. The interrogator-responser in the drawing, however, is assumed to have a decoder 40 which is intended to translate paired pulses having a 10-microsecond spacing but is intended to discriminate against paired pulses which have 5-, 15-, and 20-microsecond spacings and which may combine at random to produce some undesired paired pulses having a 10-microsecond spacing. These paired pulses and various combinations thereof will be considered in greater detail subsequently in connection with Fig. 2 of the drawings.

The time-delay network 49 includes four cascaded winding portions 51, 52, 53, and 54 each providing a time delay of 5 microseconds to an applied signal. For convenience, the terminals of the cascaded portions are designated as points 3, 4, 5, 6 and 7. Points 3 and 5 are connected to different input terminals of the coincidence repeater 50, which terminals may, for example, comprise different control electrodes of a multielectrode tube that is normally biased to anode-current cutoff and has its cathode grounded while its anode is connected to the ungrounded one of the output terminals 42, 42.

The decoder additionally includes means including a control apparatus having individual input circuits coupled to predetermined portions of the time-delay network 49 and having individual output circuits coupled to the control or switching device 48 and effectively responsive to pulses of the other pulse groups, namely to the three pulse groups of paired pulses having 5-, 15-, and 20-microsecond spacings, for deriving and applying to the device 48 a control signal which momentarily places the pulse-translating network 46 in a non-translating condition, whereby the decoder 40 has a reduced tendency to develop an undesired output signal at the terminals 42, 42 while deriving the desired output signal. This control apparatus includes three coincidence repeaters 55, 56, and 57 which preferably are similar to the repeater 50 and have corresponding input electrodes individually coupled to respective ones of the points 4, 6, and 7 on the time-delay network 49. The other input electrodes of these three repeaters are coupled through a polarity-reversing amplifier 58 to a point 1a which corresponds with the ungrounded one of the input terminals 41, 41. Each of the input electrodes just mentioned is connected to a point 1 as represented in Fig. 1. The output electrodes of the repeaters 55–57, inclusive, are coupled to a suitable circuit of the switching device 48 for applying a control or disabling pulse of negative polarity thereto. The terminal of the time-delay network 47 which is remote from point 1a is designated as point 2. The time-delay network 49 is terminated at its remote end or point 7 by a resistor 59 having a value equal to the characteristic impedance of the network for the purpose of preventing reflections from point 7. The resistor 59 is connected to a biasing source indicated as —C for the purpose of normally maintaining each of the coincidence repeaters 50 and 55–57, inclusive, in a nonconductive condition.

*General explanation of operation of pulse-translating system 40 of Fig. 1*

Prior to a detailed consideration of the circuits of the various units of the decoder 40 and the operation thereof, a general explanation of the operation of the decoder 40 of Fig. 1 will be helpful. Assuming first that a desired pair of pulses having a 10-microsecond spacing is applied to the input terminals 41, 41, those pulses are translated by time-delay network 47 which imparts a very short time delay thereto prior to their application to the switching device 48. Since the switching device 48 is normally closed, it translates the applied pulses to the input circuit of the time-delay network 49. The first pulse of the pair traverses the network section comprising portions 51 and 52 and, after an interval of 10 microseconds, is applied through point 5 to an input electrode of the coincidence repeater 50 at the same time that the second pulse of the pair is applied through point 3 to the other input electrode of that repeater. The simultaneous application of these two pulses to the normally non-conductive coincidence repeater renders it conductive so that it translates through its output circuit to terminals 42, 42 an output pulse of negative polarity for controlling the unit 34. Successive paired pulses of 10-microsecond spacings are effective to derive output pulses in the manner just explained.

Let it now be assumed that paired pulse groups having spacings of 5, 15, and 20 microseconds are applied to the terminals 41, 41 and that these paired pulses might combine at random to produce undesired or false paired pulses having the correct 10-microsecond spacing. Assuming now that such pulses are traversing the time-delay network 49 and that a pulse pair having a 5-microsecond spacing is applied to the network section 51, the first pulse of this pair reaches point 4 for application to an input electrode of the coincidence repeater 55 at substantially the same time that the undelayed second pulse is translated by amplifier 58 and applied through point 1 to the other input electrode of the coincidence repeater 55. Network 47 affords a slight delay to the signal translated by it to compensate for the finite time required for the amplifier 58 to translate an applied pulse to the normally nonconductive coincidence repeater 55. When the repeater 55 is momentarily rendered conductive, its anode potential decreases and a negative polarity pulse is applied to the switching device 48 momentarily to disable it or cancel any output signal which it would tend to develop. Thus, the second pulse of the pair with the 5-microsecond spacing may be considered effective momentarily to place the device 48 in a nontranslating condition so that the second pulse cannot be applied by point 3 to the coincidence repeater 50 in coincidence with any preceding pulse which might then have traversed the time-delay network 49 to point 5 and to the other input electrode of the coincidence repeater 50. The pulse-translating network 46 and the control apparatus or coincidence repeater 55 may be considered to be effective, with reference to undesired pulse groups which include paired pulses having 5-microsecond spacings, to prevent all second pulses of unwanted pairs from combining in any way to produce an output signal. However, they will not prevent the first pulse of an unwanted pair from acting conjointly on the coincidence repeater 50 with a pulse which was earlier in time to cause that repeater to develop a false output pulse.

Similar paired pulses with a 15-microsecond spacing will be effective at the time of the second pulse thereof to render the coincidence repeater 56 conductive so that its output signal effectively disables the switching device 48 at the time of the second pulse. Likewise, paired pulses with a 20-microsecond spacing render the coincidence repeater 57 conductive at the time of the second pulse of the pair and in effect momentarily disable the switching device. Thus, the decoder 40 discriminates against the second pulses of paired pulses having 5-, 15-, and 20-microsecond spacings which might combine with preceding pulses that are being translated by the time-delay network 49 to develop output pulses at the times of occurrence of the second pulses of the undesired pairs. Consequently, the decoder discriminates against many unwanted pulses which otherwise might impair the operation of the searching and tracking apparatus 34.

*Description of pulse-translating system or decoder 40 of Fig. 1a*

Fig. 1a is a circuit diagram of the various circuit elements represented schematically in Fig. 1. Corresponding elements in the two figures are represented by the same reference numerals. The switching device 48 comprises a triode 60 having its cathode grounded and its control electrode connected directly to the output terminal 2 of the time-delay network 47 while being connected to ground through a grid-leak resistor 61. The latter preferably terminates the network 47 in its characteristic impedance to avoid reflections. The anode of the triode 60 is connected to a source of potential +B through an anode load resistor 62 having a value preferably equal to the characteristic impedance of the time-delay network 49. The anode of triode 60 is coupled to point 3 representing the input terminal to network 49 through a coupling condenser 64. The coincidence repeaters 55, 56, 56, and 57 preferably comprise pentodes 65–68, inclusive, having their inner control electrodes coupled respectively to points 4, 5, 6, and 7, their cathodes connected directly to ground, and their screen electrodes connected in a conventional manner to a source of potential +Sc. The anodes of the tubes 65, 67, and 68 are connected through points 8, 10, and 11 and a load resistor 70 to a source of potential +B while the suppressor or outer control electrodes thereof are interconnected and are coupled through a resistor 69 to a source of bias potential —C which, with the bias on the suppressor electrodes of the tubes, is effective normally to maintain the tubes in a non-conductive condition. The suppressor electrodes are connected to the points 1 and are also coupled through a condenser 73 to the anode of a tube 72 of the polarity-reversing amplifier 58. The anodes of the tubes 65, 67, and 68 are also coupled to the cathode of a diode 71 having its anode connected directly to the anode of the tube 60 of switching device 48.

The anode of the tube 66 of the coincidence repeater 56 is coupled to the ungrounded one of the terminals 42, 42 and is also connected to a source of potential +B through a load resistor 76. The cathode of tube 66 is grounded, the screen electrode is connected to a source +Sc in a conventional manner, and the suppressor or outer control electrode is connected directly to point 3 of the time-delay network 49. The source —C, which is connected to the control electrodes of the tubes 65–68, inclusive, through resistor 59 and the network sections 54, 53, 52, and 51, is effective with the bias on the suppressor electrodes normally to maintain the repeaters in a nonconductive condition as previously mentioned. The anode terminals of the tubes 65–68, inclusive, are designated respectively as points 8, 9, 10, and 11. The control electrode of the tube 72 is connected to point 1a and is also connected to ground through a grid-leak resistor 74 which preferably terminates the input end of network 47 in its characteristic impedance. The anode of the tube is connected to a source of potential +B through a load resistor 75.

*Explanation of operation of pulse-translating system or decoder 40 of Fig. 1a*

In considering the operation of the decoder of Fig. 1a, reference will be made to the various curves of Figs. 2a–2c, inclusive. Fig. 2a represents four different individual paired pulse combinations which might be applied to the input terminals 41, 41 of the decoder. Curve I represents the desired code wherein the paired pulses have a 10-microsecond spacing, curve II represents paired pulses having a 5-microsecond spacing, curve III represents pulses having a 15-microsecond spacing, and curve IV represents a third pair of pulses having a 20-microsecond spacing. As previously mentioned, curves II, III, and IV are incorrect codes.

To facilitate understanding the manner in which it is possible for paired pulses having an incorrect pulse spacing to combine to develop another pair of pulses having the correct pulse spacing, Fig. 2b delineates three such combinations. Two pairs of pulses having a 5-microsecond spacing as in curve II of Fig. 2a are represented wherein one pair of pulses leads the other. It will be apparent that the leading and the trailing pulses of each of the different pairs can combine to produce two undesired pairs having a 10-microsecond spacing corresponding to that of the desired code represented by curve I of Fig. 2a. Similarly, two pairs of pulses having 15-microsecond spacings as in curve III of Fig. 2a may be interleaved so that both the first pulses and the second pulses of the different pairs combine to provide undesired pairs with the correct spacing. Likewise, a pair of pulses having a 20-microsecond spacing as in curve IV of Fig. 2a may straddle a second pair of pulses having a 5-microsecond spacing as in curve II therein so that the first pulses of the different pairs effectively form an undesired pair having the correct spacing. Also the first pulse of the second pair and the second pulse of the first pair effectively form an undesired pair with the correct spacing. It will be understood that numerous other combinations are possible and those which have been described above are only illustrative of some of the possible combinations.

Referring now to Fig. 2c of the drawings, it will be seen that the abscissa or time axis represents later moments of time, such as $t_1$, $t_2$, and $t_3$ as being farther to the left. The legends on the right in Fig. 2c designate the code of applied paired pulses and the points in decoder 40 where the illustrated series of pulses appear. There is represented a first pair of pulses $a$, $c$ having a 15-microsecond spacing corresponding to the incorrect code III of Fig. 2a. There is also represented a second pair of pulses $b$, $d$ which are interleaved with the pulses $a$, $c$ and have a 15-microsecond pulse spacing also corresponding to the incorrect code of curve III of Fig. 2a. When these two pairs of pulses are applied to the input terminals 41, 41 of the decoder 40 of Fig. 1a, they appear at point 1a as a series of pulses $a$, $b$, $c$, and $d$ having leading edges occurring at times $t_0'$, $t_2'$, $t_3'$, and $t_5'$. After a short time delay has been imparted thereto by the time-delay network 47, the pulses just mentioned appear at point 2 with leading edges occurring at times $t_0$, $t_2$, $t_3$, and $t_5$ as shown in Fig. 2c. After translation through the normally conductive tube 60 of the switching device 48, this series of pulses would appear at the point 3 corresponding to the input terminal of the time-delay network 49 as represented. The pulses $c$ and $d$ represented as appearing at point 3 in Fig. 2c are shaded for a reason which will be explained subsequently. Since each of the network sections 51, 52, 53, and 54 of the time-delay network 49 imparts a 5-microsecond time delay to pulses applied thereto, the series of delayed pulses appearing at points 4, 5, 6, and 7 may be represented as indicated in Fig. 2c near those legends. The pulse pairs $c$ and $d$ appearing at points 4, 5, 6, and 7 are also shaded for reasons which will be stated hereinafter. The series of negative-going pulses appearing at point 1a is amplified and reversed in polarity (and delayed slightly by the amplifier 58) to form positive-going pulses as represented adjacent the legend for point 1 in Fig. 2c.

Let us now consider the action of the coincidence repeaters 55, 56, and 57 in conjunction with the switching device 48 in discriminating against at least some of the pulses which are applied to point 1a of the decoder. The tube 65 of coincidence repeater 55 develops at its anode or point 8 a negative-polarity output pulse when coincidence of the pulses applied to points 1 and 4 occurs. Referring to the pulses delineated in Fig. 2c as appearing at points 1 and 4 it will be seen that at time $t_3$ coincidence occurs for the pulses $b$ and $c$ so that there is developed at point 8 a negative-going pulse identified as $b+c$. Referring back to the series of pulses delineated as appearing at point 3, it will be seen that the positive-going pulse $c$ is applied to point 3 from the anode of tube 60 through the coupling condenser 64. This positive-going pulse coincides in time with the negative-going pulse effectively applied from point 8 through the diode 71 and the condenser 64 to the aforesaid point 3. The magnitudes of the two applied pulses are such that a cancellation effectively occurs. Accordingly, the shaded pulse $c$ represented as appearing at point 3 does not actually exist and, hence, cannot be translated along the time-delay network 49 to points 4, 5, 6, and 7. In each instance, therefore, the pulse $c$ which might otherwise exist at points 4, 5, and 6 is represented in Fig. 2c as being shaded to indicate that this pulse actually does not exist. The cancellation of the pulse $c$ at point 3 effectively means that the second pulse of the first pair of pulses $a$ and $c$ having a 15-microsecond spacing as represented by the first curve of Fig. 2c cannot combine with a second pulse of another pair such as pulse $d$ represented in the second curve of Fig. 2c to produce an erroneous output signal.

Coincidence repeater 50 accepts those pulses appearing at point 3 which are in coincidence with those pulses appearing at point 5. From the curves of Fig. 2c it will be seen that positive-going pulses $a$ and $b$ applied to points 3 and 5 are coincident at time $t_2$ and are effective to render the tube 66 conductive, thereby developing at point 9 an output pulse of negative polarity for application to the output terminals 42, 42. Thus, the decoder 40 decodes on pulse $b$, shown in the second curve of Fig. 2c, which comprises a first pulse of an incorrect pair of pulses $a+b$. This represents an erroneous output signal but constitutes only one erroneous output pulse out of a possible two combinations for the situation presently under consideration.

The coincidence repeater 56 responds to coincident positive-going pulses appearing at points 1 and 6 and these coincidences occur at times $t_3$ and $t_5$. Tube 67 is rendered conductive at these times and develops at point 10 a pair of negative-polarity pulses which are the resultant of pulses $a+c$ and $b+d$ occurring at times $t_3$ and $t_5$. The first of these resultant pulses denoted $a+c$ participates in the cancellation of the positive-going pulse $c$ appearing at point 3 as a result of the pulse translated by the switching device 48. The second of these resultant pulses denoted $b+d$ appearing at time $t_5$ is translated from point 10 by the diode 71 and the condenser 64 and is effective to cancel a positive-going pulse appearing at point 3 at time $t_5$. Accordingly, the pulse $d$ represented as appearing at point 3 has been shaded to denote that it is nonexistent. It will be clear that pulse $d$, therefore, cannot appear at points 4, 5, 6, and 7.

The output signal appearing at point 11 of the coincidence repeater 57 is produced by any pulses which appear at point 7 in coincidence with pulses present at point 1. Since no such coincidence occurs, no output signal appears at point 11 as represented by the third from the last curve of Fig. 2c.

From the foregoing explanation of the operation of the decoder with reference to two interleaved pairs of pulses wherein each pair has a 15-microsecond spacing, it will be seen that the decoder develops but a single undesirable output pulse whereas a conventional decoder would derive a pair of undesired output pulses. It has been determined that for other pulse combinations and spacings, the decoder of Fig. 1a is effective to reduce undesired output pulses to one-quarter of the number which will be developed by a standard decoder. While the operation of the decoder 40 has been explained in connection with the application to the input terminals 41, 41 thereof of interleaved paired pulses having a 15-microsecond spacing, it will be understood that it will discriminate against other pulse groups such as those represented in Fig. 2b. Thus the decoder of Fig. 1a materially discriminates against pulse groups which might combine at random to produce undesired pulse groups having the desired spacing.

While the operation of the decoder 40 has been explained in connection with the translation of pulses through the time-delay network 49 in the forward direction, that is from left to right in the drawing, pulses developed at intermediate points along the network may also travel in the reverse direction. By an analysis similar to that represented by Fig. 2c of the drawings, it may be shown that pulses which are translated in the reverse direction do not impair the performance of the decoder 40. Diodes may be employed, if desired, between the various portions of the network 49 to avoid the translation of positive-polarity pulses in the reverse direction. Other devices which are capable of imparting a predetermined time delay to an applied pulse while translating that pulse in but a single direction, for example multivibrators, may be employed in lieu of the network 49. To facilitate the explanation of the operation of the decoder 40 and the understanding of that operation, the time-delay means 49 has been represented by a passive time-delay network.

*Description of pulse-translating system or decoder 40 of Fig. 3*

Fig. 3 represents schematically a decoder similar to that of Figs. 1 and 1a. Accordingly, corresponding elements are designated by the same reference numerals. The decoder of Fig. 3 differs from that of Figs. 1 and 1a in that the former is arranged to respond to the application of positive-polarity pulses to its input terminals 41, 41, the switching device 48 is positioned near the output circuit of the system rather than in the input circuit as in Figs. 1 and 1a, and the decoder includes a control apparatus which is somewhat different from that of Figs. 1 and 1a. The time-delay network 49 includes four cascaded portions 51–54, inclusive, with a network section comprising network portions 53 and 54 that afford a time delay equal to the desired pulse spacing. For the purpose of explaining the operation of the decoder, it will be assumed that the individual network portions just mentioned afford 5-microsecond time delays to pulses translated therethrough and that the desired pulse spacing is 10 microseconds. The points 3 and 5 of network 49 are coupled to the input electrodes of the coincidence repeater 50 which has its output circuit coupled to the cathode of an isolating diode 91 having its anode terminal, which is designated as point 8, connected to the input circuit of the switching device 48.

The control apparatus of the decoder 40 of Fig. 3 includes a second sectionalized time-delay network 80 coupled to the switching device 48 and having network sections or portions with delay characteristics corresponding to those of the first time-delay network 49, and including the three coincidence repeaters 55, 56, and 57 which are individually coupled to individual ones of the network sections. To this end, the time-delay network 80 includes portions 81–84, inclusive, which have time delays corresponding to portions 51–54, inclusive, of the time-delay network 49. The time-delay network 80 is terminated at its output end by a resistor 86 having a value equal to its characteristic impedance, which resistor is connected across an input circuit of the switching device 48. The opposite end of the network 80 is terminated by a resistor 85 having a value also equal to the characteristic impedance of the network. An output electrode of the coincidence repeater 55 is connected to the interconnected cathodes of a double diode 87, one of the anodes of which is connected to point 6 of the network 80. In a similar manner, a double diode 88 is connected between coincidence repeater 56 and point 7, and another double diode 89 is connected between coincidence repeater 57 and point 9 of network 80. The remaining anodes of these diodes are connected across a resistor 90 in another input circuit of the switching device 48, the terminals of the anodes just mentioned corresponding electrically with points 6a, 7a, and 9a represented in the drawing.

The coincidence repeater 50 responds to desired paired pulses of the proper spacing applied to its input circuits. The coincidence repeaters 55–57, inclusive, which respond to paired pulses having incorrect spacings, have a corresponding input electrode in each thereof connected to point 5 at the remote end of the time-delay network 49. The other input electrodes of the repeaters 55–57, inclusive, are individually coupled to respective ones of points 1, 2, and 4 of the network 49.

*General explanation of operation of pulse-translating system or decoder 40 of Fig. 3*

Prior to a detailed consideration of circuits of the various units of the decoder 40 and the general operation thereof, a general explanation of the operation of the decoder 40 of Fig. 3 will be helpful. Assuming first that a desired pair of pulses having a 10-microsecond spacing is applied to the input terminals 41, 41, those pulses are translated down the time-delay network 49 to its remote terminal 5. The first pulse arrives at terminal 5 and is applied to an input electrode of the coincidence repeater 50 simultaneously with the occurrence at point 3 and the application to the other input electrode of the second pulse of the proper pair. The coincident application of positive-polarity pulses renders the repeater 50 conductive and develops in its output circuit, for application through the diode 91 to the switching device 48, a pulse of negative polarity which conditions the switching device 48 to develop an output pulse of positive polarity which is amplified and translated to the output terminals 42, 42 as a negative-going pulse. Successive paired pulses having the proper spacings are effective to develop a series of output pulses at the terminals 42, 42 in the manner just described.

It will now be assumed that paired pulse groups having a spacing of 5, 15, and 20 microseconds are applied to the input terminals 41, 41 and that these paired pulses might combine at random to produce undesired or false paired pulses having the correct 10-microsecond spacing. Assume now that such pulses are traversing the network 49 and that a pulse pair having a 5-microsecond spacing appears at points 4 and 5 of network portion 54. Since the first pulse of this pair reaches point 5 for application to an input electrode of coincidence repeater 57 at substantially the same time that the less delayed second pulse is applied through point 4 to the other input electrode of the coincidence repeater, an output pulse of negative polarity from unit 57 renders the double diode 89 momentarily conductive and one section of the diode applies that pulse through point 9a across the resistor 90 in an input circuit of the switching device 48. This pulse momentarily disables the switching device so that any output pulse which might then appear at point 8 in the output circuit of the coincidence repeater 50, as a result of the coincidence of the first pulse appearing at point 5 with a pulse being translated along the network 49 to point 3, is not translated to the output circuit of the switching device 48. Consequently, the coincidence repeater 57 may be said to discriminate against the first pulse of an improper pair having a 5-microsecond spacing. The negative-polarity pulse which rendered the diode 89 conductive is also applied to point 9 and, after a 5-microsecond delay imparted to the pulse by the network portion 84, is applied by point 10 across the resistor 86 to another input circuit of the switching device 48 so as momentarily to disable it at that time. The translation of the negative polarity control pulse from point 9 to point 10 occurs simultaneously with the translation of the second pulse of the unwanted pair from point 4 through network portion 54 of network 49 to point 5 thereof. Consequently, when the second pulse of the unwanted pair reaches point 5 for application to the coincidence repeater 50 at an instant when a positive-going pulse may reach point 3 from network portion 52 to condition the repeater 50 to develop a negative-polarity output pulse for translation through the diode 91 to the switching device 48, the latter is effectively disabled. Thus, it may be said that the decoder 40 prevents the second pulse of a pulse pair having this improper spacing from combining with another pulse of an unwanted pair to produce an erroneous output signal. Similarly, coincidence repeaters 56 and 55 and their associated circuits discriminate against both the first and second pulses of pulse pairs having 15- and 20-microsecond spacings, whereby these pulses are ineffective to combine at random to produce an erroneous output signal.

*Description of pulse-translating system or decoder 40 of Fig. 3a*

Fig. 3a is a circuit diagram of the various units represented schematically in Fig. 3. Corresponding elements in the two figures are designated by the same reference characters. The coincidence repeaters 55, 56, 50, and 57 include pentodes 65–68, inclusive, having their input circuits connected to the time-delay network 49 as represented. The cathodes of the diodes 87, 88, 91, and 89, respectively, are connected to ground through resistors 94, 95, 96, and 97 and are coupled through suitable coupling condensers to the anodes of the tubes 65, 67, 66, and 68. The anodes of these tubes are connected to a source of potential +B through respective load resistors 70, 93, 76, and 94. The switching device 48 includes a pentode 98 which is normally conductive and has its cathode grounded, its screen electrode connected in a conventional manner to a source +Sc, and its anode connected to a source of potential +B through a load resistor 99. The anode of the tube 98 is also coupled through a coupling condenser 100 to the control electrode of a triode 101 having its cathode grounded and its control electrode connected through a resistor 102 to a biasing source —C which is effective normally to maintain the triode in a nonconductive condition. The anode of tube 101 is connected to a triode 103 having an anode load resistor 104 connected to a source of potential +B. The control electrode of the tube 103 is coupled to the anode of diode 91 and is also connected to ground through a gridleak resistor 105. The anode of tube 103 is connected to the anode of a diode 106 having its cathode connected to the ungrounded one of the input terminals of the amplifier 92.

*Explanation of operation of pulse-translating system or decoder 40 of Fig. 3a*

In considering the operation of the decoder of Fig. 3a, reference will be made to the various curves of Fig. 4 to facilitate the understanding of this operation. It will be seen from Fig. 4 that the abscissa or time axis represents the later moments of time such as times $t_1$, $t_2$, and $t_3$ as being farther to the left. The legends on the right in Fig. 4 designate the code of the applied paired pulses and the points in the decoder 40 where the illustrated series of pulses appear. Again, there is represented a first pair of pulses $a$, $c$ having a 15-microsecond spacing corresponding to the incorrect code III of Fig. 2a. There is also represented a second pair of pulses $b$, $d$ which are interleaved with the pulses $a$, $c$ and have a 15-microsecond pulse spacing also corresponding to the incorrect code of curve III of Fig. 2a.

When these two pairs of pulses are applied to the input terminals 41, 41 of the decoder 40 of Fig. 3a, they appear at point 1 as a series of pulses $a$, $b$, $c$, and $d$ having leading edges occurring at times $t_0$, $t_2$, $t_3$, and $t_5$. After a short delay imparted thereto by network portion 52, the pulses just mentioned appear at point 2 with leading edges occurring at times $t_1$, $t_3$, $t_4$, and $t_6$. Network portions 53, 54, and 55 impart additional 5-microsecond delays to the translated pulses so that the series of pulses appearing at points 3, 4, and 5 are as represented adjacent those legends in Fig. 4 of the drawings. Any output signals developed at points 6 and 6a by repeater 55 are a result of the simultaneous application of positive-going pulses appearing at points 1 and 5 to the input circuits of the tube 65 of the coincidence repeater 55. Since there are no coincidences of the pulses present at points 1 and 5, the signal developed at point 6 may be represented by the horizontal line shown in the drawings.

The signals appearing at points 7 and 7a by repeater 56 are the result of the simultaneous application of the signals appearing at points 2 and 5, and from Fig. 4 of the drawings it will be seen that coincidences appear at times $t_4$ and $t_6$. The simultaneous application at time $t_4$ of the positive pulse $c$ at point 2 and the positive pulse $a$ at point 5 to the coincidence repeater 56 renders tube 67 conductive and develops at its anode for application through the diode 88 to points 7 and 7a the negative polarity pulse $a+c$ represented in the drawings for point 7. Similarly, the positive-going pulses $d$ and $b$ appearing at respective points 2 and 5 at time $t_6$ actuate the coincidence repeater 56 and develop at points 7 and 7a the negative polarity pulse $b+d$ represented as being developed at point 7 at time $t_6$. The pulses which are developed at point 7, after being delayed 10 microseconds by network sections 82 and 83, appear at point 9 of the time-delay network 80 with leading edges occurring at times $t_6$ and $t_8$ as represented in the drawings by the legend "Point 7 delayed." The signal which is developed at point 9 results from the delayed signal just mentioned and the output signal developed at the anode of tube 68 of coincidence repeater 57 as a result of the coincident application of positive-going pulses at points 4 and 5 to the input electrodes of tube 68. A coincidence of the pulses appearing at points 4 and 5 occurs only at time $t_6$ and the positive-polarity pulses $c$ and $b$ occurring at those points at that time develop at point 9 the negative-polarity pulse $b+c$. The pulse $b+c$ coincides with the pulse $a+c$ translated to point 9 from point 7 through the network portions 82 and 83 and the two pulses effectively may be considered as a single pulse. It will be noted in the curves for the pulses appearing at points 3 and 5 that at the time $t_6$ no two positive pulses which are coincident in time are present. Accordingly, the influence of the negative-polarity pulse which appears at point 9a at time $t_6$ insofar as it alters the operation of the switching device 48 may be neglected.

The pairs of negative-polarity pulses which appear at point 9 at times $t_6$ and $t_8$ are translated through the network portion 84 with a 5-microsecond delay and appear at point 10 at times $t_7$ and $t_9$ as represented in Fig. 4. Referring to the curves illustrating the pulses appearing at points 3 and 5 at time $t_7$, it will be seen that two positive-polarity pulses $c$ and $d$ are applied by points 5 and 3, respectively, to the inner and outer control electrodes of the tube 66 of coincidence repeater 50. These pulses render tube 66 conductive and develop at its anode for translation through diode 91 a negative-polarity pulse which is applied at time $t_7$ to point 11 at the control electrode of the tube 103 substantially simultaneously with the application from point 10 of a negative-polarity pulse to the outer control electrode of the tube 98. The two pulses which are applied to the switching device 48 at time $t_7$ effectively nullify each other in a manner which will be presently described so that no output signal is applied by unit 48 to amplifier 92 for translation to the output terminals 42, 42 of the decoder 40.

The negative-polarity pulse applied at time $t_7$ to the control electrode of the normally conductive tube 98 momentarily renders that tube nonconductive, thereby developing a positive-polarity pulse at its anode for application to the control electrode of the normally nonconductive tube 101. The last-mentioned pulse renders tube 101 conductive so that it tends to develop a negative-polarity pulse at its anode at time $t_7$. Substantially simultaneously, the negative-polarity pulse applied to the control electrode of tube 103 at time $t_7$ tends to develop a positive-polarity pulse at the anode of that tube. As a result, the anodes of tubes 101 and 103 do not experience any change in potential at time $t_7$. Consequently, no signal is developed at the cathode of the diode 106 which corresponds to point 12 for application to the amplifier 92 and translation to the output terminals 42, 42. Thus, the pulse identified as $b+c$ and $a+c$ appearing at point 10 at time $t_7$ when applied to the switching device 48 nullify the effect of pulse $d$, which is the incorrect second pulse of the second pulse pair $c+d$, and also nullify the effect of pulse $c$, which is the wrong second pulse of the first pulse pair $a+c$, appearing at points 3 and 5 at time $t_7$.

Fig. 4 also illustrates the pulses appearing at point 9a at times $t_4$ and $t_6$. The signal appearing at these instants at point 9a consists of the pulses then appearing at points 6a and 7a in combination with any pulse developed at the anode of tube 68 and translated by the diode 89 as a result of positive-polarity pulses appearing at points 4 and 5 at times $t_4$ and $t_6$. The pulses appearing at points 6a and 7a are identical with those represented in Fig. 4 of the drawings as appearing at points 6 and 7 and, therefore, constitute negative-polarity pulses $a+c$ and $b+d$ occurring at times $t_4$ and $t_6$, respectively. At time $t_6$ the positive-polarity pulses $c$ and $b$ are applied by points 4 and 5 to the inner and outer control electrodes of the tube 68 of the repeater 57, thereby developing at its anode for translation through diode 89 to point 9a a negative-polarity pulse identified in the drawings as $b+c$, which pulse coincides with the pulse $b+d$ translated from point 7a. These pulses effectively constitute a single pulse which alters the conductivity of tube 98 and develops at its anode a positive pulse which renders tube 101 conductive. The latter develops a negative-polarity pulse at its anode. However, the diode 106 is poled so that it cannot translate this pulse to unit 92 and the output terminals 42, 42. Since at time $t_6$ there is no coincidence of a pulse appearing at point 3 with the pulse $b$ at point 5, the coincidence repeater 50 does not develop at time $t_6$ an output pulse for application to the switching device 48. Accordingly, no output pulse is developed by the decoder 40 at time $t_6$.

Referring to the curves illustrating the pulses applied by points 3 and 5 at time $t_4$ to the control electrodes of the tube 66 of coincidence repeater 50, it will be seen that positive-polarity pulses $b$ and $a$ are effective to render tube 66 conductive thereby developing at its anode for translation through diode 91 and the time-delay network 47 a negative-polarity pulse for application at time $t_4$ to point 11 and the control electrode of tube 103 of the switching device 48. The negative-polarity pulse $a+c$ applied at time $t_4$ by point 9a to the inner control electrode of the tube 98 renders it nonconductive and (in the manner previously described in connection with the negative-polarity pulse developed at time $t_7$ and applied to the outer control electrode of tube 98), so controls the operation of tube 101 at time $t_4$ as to cancel at the interconnected anodes of the tubes 101 and 103 any output pulse which might be developed thereat as the result of the application at time $t_4$ of the negative-polarity pulse to the control electrode of tube 103 from the anode circuit of the coincidence repeater 50. Thus, the negative-polarity pulse $a+c$ occurring at points 9a at time $t_4$ nullifies the effect of pulse $b$ appearing at point 3 at time $t_4$, which pulse constitutes the wrong first pulse of the second pair of pulses $b+d$, and also the pulse $a$ applied by point 5 at time $t_4$ to the outer control electrode of tube 66, which pulse represents the wrong first pulse of the first pair of pulses $a+c$. The output signal appearing at point 12, therefore, constitutes the straight-line curve represented in Fig. 4 of the drawings, thus indicating that the two interleaved pairs of pulses having 15-microsecond spacings and constituting the undesired first code III and the undesired second code III are ineffective to develop an output signal in the decoder 40 even though the first pulses $a$ and $b$ of the two pairs and also the second pulses $c$ and $d$ of the two pairs have the correct pulse spacing. Similarly, the decoder 40 is effective to reject other pulse combinations having different spacings which might combine at random to produce undesired paired pulses having the correct 10-microsecond spacing.

As with the Fig. 1a embodiment of the invention, the operation of the Fig. 3a decoder 40 has been explained in connection with the translation of pulses in networks 49 and 80 only in the forward direction. Pulses translated in the reverse direction through these networks do not impair the operation of the decoder. Other time-delay devices may also be employed in place of the various portions of the networks 49 and 80.

While the decoder of the present invention has been described in detail in an interrogator-responser, it will be apparent to those skilled in the art that it also has utility as the decoder of a transponder beacon.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A pulse-translating system comprising: an input circuit for supplying desired pulse groups having a given pulse spacing and subject to the translation of a plurality of other pulse groups having other pulse spacings which may combine at random to produce undesired pulse groups having said given spacing; a pulse-translating network coupled to said input circuit and including a normally closed switching device and a pulse-selector circuit responsive to said desired pulse groups for deriving therefrom a desired output signal but which tends to respond to and develop from said undesired pulse groups and undesired output signal; and means including control apparatus coupled to said network and said device and effectively responsive to pulses of said other pulse groups for deriving and applying to said device a control signal which momentarily opens said switching device and places said network in a nontranslating condition for pulses at said other spacings, whereby said system has a reduced tendency to develop said undesired output signal while deriving said desired output signal.

2. A pulse-translating system comprising: an input circuit for supplying desired pulse groups having a given pulse spacing and subject to the translation of a plurality of other pulse groups having other pulse spacings which may combine at random to produce undesired pulse groups having said given spacing; a pulse-translating network coupled to said input circuit and including a normally closed electronic switching device and a pulse-selector circuit responsive to said desired pulse groups for deriving therefrom a desired output signal but which tends to respond to and develop from said undesired pulse groups an undesired output signal; and means including control apparatus coupled to said network and said device and effectively responsive to pulses of said other pulse groups for deriving and applying to said device a control signal which effectively momentarily opens said switching device and places said network in a nontranslating condition for pulses at said other spacings whereby said system has a reduced tendency to develop said undesired output signal while deriving said desired output signal.

3. A pulse-translating system comprising: an input circuit for supplying desired pulse groups having a given pulse spacing and subject to the translation of a plurality of other pulse groups having other pulse spacings which may combine at random to produce undesired pulse groups having said given spacing; a pulse-translating network coupled to said input circuit, including a control device and a pulse-selector circuit comprising time-delay means responsive to said desired pulse groups for deriving therefrom a desired output signal but which tends to respond to and develop from said undesired pulse groups and undesired output signal; and means including control apparatus coupled to said input circuit, said time-delay means, and said device and effectively responsive to pulses of said other pulse groups for deriving and applying to said device a control signal which momentarily places said device in a nontranslating condition for pulses at said other spacings, whereby said system has a reduced tendency to develop said undesired output signal while deriving said desired output signal.

4. A pulse-translating system comprising: an input circuit for supplying desired pulse groups having a given pulse spacing and subject to the translation of a plurality of other pulse groups having other pulse spacings which may combine at random to produce undesired pulse groups having said given spacing; a pulse-translating network coupled to said input circuit, including a control device, time-delay means, and a coincidence repeater having an output circuit, responsive to said desired pulse groups for deriving therefrom in said output circuit a desired output signal but which tends to respond to and develop in said output circuit from said undesired pulse groups an undesired output signal; and means including control apparatus coupled to said input circuit, said time-delay means, and said device and effectively responsive to pulses of said other pulse groups for deriving and applying to said device a control signal which momentarily places said network in a nontranslating condition for pulses at said other spacings, whereby said system has a reduced tendency to develop in said output circuit said undesired output signal while deriving said desired output signal.

5. A pulse-translating system comprising: an input circuit for supplying desired pulse groups having a given pulse spacing and subject to the translation of a plurality of other pulse groups having other pulse spacings which may combine at random to produce undesired pulse groups having said given spacing; a pulse-translating network coupled to said input circuit, including a control device, a one-way time-delay network, and a coincidence repeater having an output circuit, responsive to said desired pulse groups for deriving therefrom in said output circuit a desired output signal but which tends to respond to and develop in said output circuit from said undesired pulse groups an undesired output signal; and control apparatus coupled to said input circuit, said time-delay network, and said device and effectively responsive to pulses of said other pulse groups for deriving and applying to said device a control signal which momentarily places said pulse-translating network in a nontranslating condition for pulses at said other spacings, whereby said system has a reduced tendency to develop in said output circuit said undesired output signal while deriving said desired output signal.

6. A pulse-translating system comprising: an input circuit for supplying desired pulse groups having a given pulse spacing and subject to the translation of a plurality of other pulse groups which may combine at random to produce undesired pulse groups having said given spacing; a pulse-translating network coupled to said input circuit and including a control device and a pulse-selector circuit responsive to said desired pulse groups for deriving therefrom a desired output signal but which tends to respond to and develop from said undesired pulse groups an undesired output signal; and means including control apparatus including a plurality of coincidence repeaters having individual input circuits coupled to predetermined portions of said network and having individual output circuits coupled to said device and effectively responsive to pulses of said other pulse groups for deriving and applying to said device a control signal which momentarily places said network in a nontranslating condition, whereby said system has a reduced tendency to develop said undesired output signal while deriving said desired output signal.

7. A pulse-translating system comprising: an input circuit for supplying desired pulse groups having a given pulse spacing and subject to the translation of a plurality of other pulse groups which may combine at random to produce undesired pulse groups having said given spacing; a pulse-translating network coupled to said input circuit and including a control device, a first time-delay network, and a pulse-selector circuit responsive to said desired pulse groups for deriving therefrom a desired output signal but which tends to respond to and develop from said undesired pulse groups an undesired output signal; and control apparatus including a second time-delay network coupled to said device and having a delay characteristic corresponding to that of said first network, and a plurality of coincidence repeaters having individual input circuits coupled to predetermined portions of said first network and having individual output circuits coupled to said device and said second network and effectively responsive to pulses of said other pulse groups for deriving and applying to said device a control signal which momentarily places said pulse-translating network in a nontranslating condition, whereby said system has a reduced tendency to develop said undesired output signal while deriving said desired output signal.

8. A pulse-translating system comprising: an input circuit for supplying desired pulse groups having a given pulse spacing and subject to the translation of a plurality of other pulse groups which may combine at random to produce undesired pulse groups having said given spacing; a pulse-translating network coupled to said input circuit and including a control device, a first time-delay network, and a pulse-selector circuit coupled to predetermined portions of said first network and in cascade with said control device and responsive to said desired pulse groups for deriving therefrom a desired output signal but which tends to respond to and develop from said undesired pulse groups an undesired output signal; and control apparatus including a second time-delay network coupled to said device and having a delay characteristic corresponding to that of said first network, and a plurality of coincidence repeaters having individual input circuits coupled to predetermined portions of said first network and having individual output circuits coupled to said device and said second network and effectively responsive to pulses of said other pulse groups for deriving and applying to said device a control signal which momentarily places said pulse-translating network in a nontranslating condition, whereby said system has a reduced tendency to develop said undesired output signal while deriving said desired output signal.

9. A pulse-translating system comprising: an input circuit for supplying desired pulse groups having a given pulse spacing and subject to the translation of a plurality of predetermined other pulse groups which may combine at random to produce undesired pulse groups having said given spacing; a pulse-translating network coupled to said input circuit, including a control device, a nonreflecting time-delay network having a plurality of network sections individually affording a time delay equal to the pulse spacing of individual ones of said other pulse groups, and a coincidence repeater coupled to predetermined ones of said network sections and having an output circuit, responsive to said desired pulse groups for deriving therefrom in said output circuit a desired output signal but which tends to respond to and develop in said output circuit from said undesired pulse groups an undesired output signal; and control apparatus including a plurality of coincidence detectors individually coupled to predetermined ones of said network sections and to said device and effectively responsive to pulses of said other pulse groups for deriving and applying to said device a control signal which momentarily places said pulse-translating network in a nontranslating condition, whereby said system has a reduced tendency to develop in said output circuit said undesired output signal while deriving said desired output signal.

10. A pulse-translating system comprising: an input circuit for supplying desired pulse groups having a given pulse spacing and subject to the translation of a plurality of predetermined other pulse groups which may combine at random to produce undesired pulse groups having said given spacing; a pulse-translating network coupled to said input circuit, including a control device, a nonreflecting time-delay network having a first network section affording a time delay equal to said given pulse spacing and having a plurality of network sections individually affording a time delay equal to the pulse spacing of individual ones of said other pulse groups, and a coincidence repeater coupled to said first network section and having an output circuit, responsive to said desired pulse groups for deriving therefrom in said output circuit a desired output signal but which tends to respond to and develop in said output circuit from said undesired pulse groups an undesired output signal; and control apparatus including a plurality of coincidence detectors individually coupled to individual ones of said plurality of network sections and to said device and effectively responsive to pulses of said other pulse groups for deriving and applying to said device a control signal which momentarily places said pulse-translating network in a nontranslating condition, whereby said system has a reduced tendency to develop in said output circuit said undesired output signal while deriving said desired output signal.

11. A pulse-translating system comprising: an input circuit for supplying desired pulse groups having a given pulse spacing and subject to the translation of three predetermined other pulse groups which may combine at random to produce undesired pulse groups having said given spacing; a pulse-translating network coupled to said input circuit, including a control device, a nonreflecting time-delay network having a first network section affording a time delay equal to said given pulse spacing and having three network sections individually affording a time delay equal to the pulse spacing of individual ones of said other pulse groups, and a coincidence repeater coupled to said first network section and having an output circuit, responsive to said desired pulse groups for deriving therefrom in said output circuit a desired output signal but which tends to respond to and develop in said output circuit from said undesired pulse groups an undesired output signal; and control apparatus including a plurality of coincidence detectors individually coupled to individual ones of said three network sections and to said device and effectively responsive to pulses of said other pulse groups for deriving and applying to said device a control signal which momentarily places said pulse-translating network in a nontranslating condition, whereby said system has a reduced tendency to develop in said output circuit said undesired output signal while deriving said desired output signal.

12. A pulse-translating system comprising: an input circuit for supplying desired pulse groups having a given pulse spacing and subject to the translation of a plurality of predetermined other pulse groups which may combine at random to produce undesired pulse groups having said given spacing; a pulse-translating network coupled to said input circuit, including a control device, a first time-delay network having a first network section affording a time delay equal to said given pulse spacing and having a plurality of network sections individually affording a time delay equal to the pulse spacing of individual ones of said other pulse groups, and a coincidence repeater coupled to said first network section and having an output circuit, responsive to said desired pulse groups for deriving therefrom in said output circuit a desired output signal but which tends to respond to and develop in said output circuit from said undesired pulse groups an undesired output signal; and control apparatus including a second time-delay network coupled to said device and having network sections with delay characteristics corresponding to those of said first network, and a plurality of coincidence detectors individually coupled to individual ones of said plurality of network sections, said corresponding network sections, and to said device and effectively responsive to pulses of said other pulse groups for deriving and applying to said device a control signal which momentarily places said device in a nontranslating condition, whereby said system has a reduced tendency to develop in said output circuit said undesired output signal while deriving said desired output signal.

13. A pulse-translating system comprising: an input circuit for supplying desired pulse groups having a given pulse spacing and subject to the translation of a plurality of other pulse groups which may combine at random to produce undesired pulse groups having said given spacing; a pulse-translating network coupled to said input circuit and including a control device and a pulse-selector circuit responsive to said desired pulse groups for deriving therefrom a desired output signal but which tends to respond to and develop from said undesired pulse groups an undesired output signal; and means including control apparatus having individual input circuits coupled to predetermined portions of said network and having individual output circuits coupled to said device and including time-delay means coupled to said output circuits and said device and effectively responsive to pulses of said other pulse groups for deriving and applying to said device a control signal which momentarily places said network in a nontranslating condition, whereby said system has a reduced tendency to develop said undesired output signal while deriving said desired output signal.

14. A pulse-translating system comprising: an input circuit for supplying desired pulse groups having a given pulse spacing and subject to the translation of a plurality of other pulse groups which may combine at random to produce undesired pulse groups having said given spacing; a pulse-translating network coupled to said input circuit and including a control device and a pulse-selector circuit responsive to said desired pulse groups for deriving therefrom a desired output signal but which tends to respond to and develop from said undesired pulse groups an undesired output signal; and control apparatus, including a plurality of coincidence repeaters having individual input circuits coupled to predetermined portions of said network and having individual output circuits coupled to said device and including time-delay means coupled to said output circuits and said device, effectively responsive to pulses of said other pulse groups for deriving and applying to said device a control signal which momentarily places said network in a nontranslating condition, whereby said system has a reduced tendency to develop said undesired output signal while deriving said desired output signal.

References Cited in the file of this patent

UNITED STATES PATENTS

| | | |
|---|---|---|
| 1,763,390 | Davis | June 10, 1930 |
| 2,293,869 | Vaughan | Aug. 25, 1942 |
| 2,444,741 | Loughlin | July 6, 1948 |
| 2,577,141 | Mauchly et al. | Dec. 4, 1951 |
| 2,670,463 | Raymond et al. | Feb. 23, 1954 |
| 2,706,810 | Jacobsen | Apr. 19, 1955 |